United States Patent Office 3,423,350
Patented Jan. 21, 1969

3,423,350
AMINOPLAST FOR ANCHOR-COATING CELLOPHANE
Cornelius J. Ryan, Staten Island, New York, N.Y., assignor to E. I. du Pont de Nemours and Company, a corporation of Delaware
No Drawing. Filed Dec. 30, 1965, Ser. No. 517,819
U.S. Cl. 260—29.4        3 Claims
Int. Cl. C08g 9/30; C08g 57/30; C08j 1/38

ABSTRACT OF THE DISCLOSURE

Process for preparing aqueous aminoplast solutions for anchor-coating cellophane comprising reacting guanidine, triethanolamine, formaldehyde and water to form a first aminoplast solution (A), heating (A) with melamine to obtain a second aminoplast solution (B) and diluting (B) with formaldehyde, water and isopropanol.

---

This invention relates to aminoplasts and more particularly to aqueous aminoplast solutions for anchor coating cellophane, their preparation, and cellophane anchor-coated with such aminoplast.

It has previously been proposed to prepare aqueous aminoplast solutions from polyfunctional aliphatic polyamine, melamine and formaldehyde to give wet strength to paper, and, where the polyfunctional amine is a polyalkylene polyamine, to anchor-coat substrates such as cellophane for top coating with another material, cf. Suen et al. U.S. Patents 2,769,799 and 2,769,800, and Wooding et al. U.S. Patents 2,796,362 and 2,856,314.

In accordance with the present invention it has been found that aqueous aminoplast solutions affording advantageous results in anchor coating cellophane are obtained by a process which critically comprises (1) heating together, at 60° C. to 65° C. and pH 6.5 to 6.8, 0.007 to 0.133 molar parts guanidine, 0.4 to 1.8 molar parts triethanolamine, 8 to 9 molar parts formaldehyde and 20 to 36 molar parts water, until at least one molecule of formaldehyde reacts per molecule of total amine to obtain a first aminoplast solution (A); heating (A) with one molar part melamine, at a temperature in the range of 55° C. to 70° C. and a pH in the range of 6.0 to 6.6 which is within about ±0.2 pH unit of $[6.2+(0.21)(a)]$ where $a$ is any total molar parts of guanidine plus triethanolamine used, in excess of 0.5, per molar part of melamine, to obtain a second aminoplast solution (B) having a viscosity between I and Q on the Gardner-Holdt scale at 25° C.; and (3) diluting (B) with 2 to 3 molar parts formaldehyde, 5 to 12 molar parts water, 4 to 5 molar parts isopropanol and neutralizing to pH 6.5 to 7.1. By "molar parts" is meant gram molecular weight multiplied by any desired scale factor which is constant for a particular preparation.

The process is preferably carried out in a stirred stainless steel vessel jacketed with water for heating and cooling. Preferably water is first added to the stirred vessel and heated, after which it is diluted with warm concentrated aqueous formaldehyde solution, the diluted formaldehyde is brought to the desired temperature range, melted triethanolamine and guanidine as guanidine carbonate are slowly added to the stirred charge, pH is adjusted to 6.6 to 6.7, and the reactor contents held at the specified pH and temperature for 20 to 40 minutes to complete the preliminary reaction.

In this first step pH is preferably 6.6 to 6.7. At pH below 6.5, temperature above 65° C. or water proportions below about 20 molar parts, insolubles are produced; at pH above 6.8, temperatures below 60° C., or water proportions above 36 molar parts, side reactions are favored over the desired methyloization of the amines to soluble products. It has been found that carrying out this preliminary reaction before adding melamine leads to markedly improved storage stability in the final product.

On completion of step 1, melamine is preferably slowly added to the stirred first aminoplast solution over 30 to 60 minutes, after which the pH is adjusted to a value in the range of 6.0 to 6.6 which is within about ±0.2 pH unit of $[6.2+(0.21)(a)]$ where $a$ is any total molar parts of guanidine plus triethanolamine used, in excess of 0.5, per molar part of melamine. In general, it is preferred to use lower amounts, in the range of 0.4–1.0 molar part triethanolamine, when the final solution is to be diluted with soft water for anchor coating, in which case the pH in the second step will preferably be about 6.3, and higher amounts, e.g., 1.0 to 1.8 molar parts triethanolamine, when the final solution is to be diluted with hard water for anchor coating, in which case the pH in the second step will preferably be about 6.5. Again, in this second step, pH lower than specified, temperature above 70° C., or water below 20 molar parts tends to produce insolubles, while pH higher than specified, temperature below 55° C., or water above 36 molar parts, tends to favor undesired side reactions.

When the viscosity end-point is reached, the reaction mixture is storage stabilized by cooling, diluting and neutralizing. Preferably cooling water is circulated through the jacket, and during cooling the batch is successively diluted with aqueous formaldehyde and isopropanol, or a mixture thereof, and the diluted batch is neutralized to pH 6.5 to 7.1. The storage-stabilized product preferably contains 9 to 11 weight percent free formaldehyde and 29 to 32 weight percent dissolved resin solids.

The pH values and viscosity values specified may be measured on samples cooled to 25° C., or measured at higher temperatures and corrected to 25° C. In the early stage of viscosification after completing melamine addition, viscosity samples may gel on cooling to 25° C., but this is a transitory phenomenon. Slight exotherms occur during addition of the amines and are preferably controlled by cooling water in the jackets, so as to maintain temperature below about 65° C. during amine addition for steps 1 and 2. Trace amounts of insolubles formed during the course of the reactions are preferably removed by filtering the neutralized final product through stainless steel screens.

EXAMPLE I

Into a stirred stainless steel kettle jacketed with water for heating and cooling, 11.5 molar parts water were charged and heated to 55° C. A solution of 8.2 molar parts formaldehyde in 13.8 molar parts water was added and the mixture heated to 65° C. Further, 0.5 molar part melted triethanolamine and guanidine carbonate equivalent to 0.122 molar part guanidine were added during 30 minutes while maintaining charge temperature at 60 to 65° C. The pH was adjusted to 6.6–6.7 with aqueous 90 percent formic acid and the solution heated at 60° C. to 65° C. for 30 minutes to obtain a first aminoplast solution containing less than 7.6 molar parts free formaldehyde.

To this first aminoplast solution was slowly added one molar part melamine during 30 to 90 minutes while maintaining temperature at 55° C. to 65° C. The resulting solution was acidified to pH 6.2 with aqueous 90 percent formic acid, and heated to 65–70° C. during 5 hours to a viscosity of J–K on the Gardner-Holdt scale as measured on a sample cooled to 25° C. The viscosified solution was cooled by cooling water in the kettle jacket and diluted successively with 3.9 molar parts cold water, a solution of 2.5 molar parts formaldehyde in 4.1 molar parts water, and 4.8 parts isopropyl alcohol while cooling to 30–40° C. The cooled product was neutralized to pH 6.5–6.7 with aqueous 20 percent caustic and filtered through a standard 100 mesh stainless steel screen to remove trace solids. The pH values in this example were determined on samples cooled to 25° C.

The final product contained 29–32 weight percent dissolved resin solids and 10 to 11 weight percent free formaldehyde, and had a viscosity in the range of 15 to 50 centipoises at 25° C. A sample was completely dispersible in all proportions with water at pH 6.6. The product showed surprising stability in that it remained completely water dispersible after being frozen and thawed, and was shipped without deterioration in unheated tank trucks at sub-freezing temperature. No substantial change in usefulness for anchor-coating cellophane resulted from drum storage at ambient temperature for one year. In contrast an aminoplast resin prepared identically, except that pH during the first step reaction was 6.3, was unstable to freeze thaw and required shipment in trucks heated to 40° F. to 90° F. in cold weather, as did also commercially available prior art aminoplast solutions for anchor coating cellophane.

EXAMPLE II

The procedure of Example I was repeated except that 1.8 molar parts triethanolamine were used in step 1, pH after adding melamine was adjusted to 6.5, and heating at this pH during step 2 was continued for about 8 hours until the solution reached a viscosity of N on the Gardner-Holdt scale as measured on a sample at 25° C. The final product was substantially the same as the product of Example I, meeting the same specifications and showing substantially the same storage stability and anchor coating performance in the tests described in Examples I and III through V, with the exception that use of the product of Example II made it possible to replenish the anchor-coating bath of Example III, so as to permit continuous running for a longer period of time without replacing the bath, when the diluent water used in the bath was hard water, whereas about the same bath life resulted with either product when the bath diluent water was soft.

EXAMPLE III

Regenerated cellulose film in the gel state, which had been cast from viscose solution and purified in the normal manner, was passed through an aqueous softening and anchor-coating bath containing 7 weight percent glycerol and in the range of 0.05 to 0.5 weight percent aminoplast resin, the bath being prepared by diluting the final product of the process of Example I. The pH of the bath was maintained at about 4 with lactic acid. Excess bath was removed by squeegees and the film was dried in the conventional way at 60–90° C. in contact with heated dryer rolls to obtain an anchor-coated cellophane test film. A control anchor-coated cellophane test film was prepared in the same way except that the bath was prepared by diluting a commercial cellophane anchor-coating aminoplast resin solution representative of the prior art. The anchor-coated test and control films so prepared, containing about 15 weight percent glycerol and 0.4 weight percent of the aminoplast resin were top-coated in a bath of the following composition:

| Ingredient | Parts by weight |
|---|---|
| Nitrocellulose (11.4 weight percent nitrogen) | 56.2 |
| Diethyleneglycol ester of terpenemaleic acid | 11.2 |
| Dibutyl phthalate | 19.9 |
| Dicyclohexyl phthalate | 19.9 |
| Sulfated wood rosin | 5.8 |
| Crystalline paraffin, M.P. 60° C. | 3.5 |
| Maleic acid | 3.0 |
| Ethyl acetate | 573.9 |
| Ethyl alcohol | 24.1 |
| Toluene | 285.0 |

The top coated test film had a heat seal strength of 431 grams per inch after drying, heat sealing, and conditioning at 35 percent relative humidity and 161 grams per inch after drying and conditioning at 81 percent relative humidity. In contrast the top coated control film had a heat seal strength of 287 grams per inch after drying, heat sealing and conditioning at 35 percent relative humidity and 141 grams per inch after conditioning at 81 percent relative humidity.

EXAMPLE IV

The anchor-coated test and control films of Example III were top coated with an aqueous copolymer dispersion prepared by reacting a charge of the following ingredients at 33–34° C. for two hours:

| Ingredient | Parts by weight |
|---|---|
| Water | 400 |
| Vinylidine chloride | 380 |
| Methal acrylate | 20 |
| Itaconic acid | 8 |
| Sodium lauryl sulfate | 8 |
| Ammonium persulfate | 2 |
| Meta sodium bisulfite | 1 |

After drying, heat sealing, and conditioning as in Example III, the top coated test and control films conditioned at 35 percent relative humidity had heat seal strengths of 262 grams per inch and 250 grams per inch respectively, and those conditioned at 81 percent relative humidity had heat seal strengths of 181 grams and 130 grams respectively.

EXAMPLE V

Test and control anchor-coated films were prepared by the general procedure of Example III to contain about 15 weight percent glycerol and, respectively, 0.11 weight percent of the aminoplast of Example I and 0.17 weight percent of the commerical aminoplast of Example III. These films were top coated with polyethylene by melt extrusion. Strips of the top coated test and control films were heat sealed between heated jaws at 150° C. and 20 pounds per square inch pressure for a one-half second dwell time and conditioned 24 hours at 80 percent relative humidity. The test film showed a heat seal strength of 1290 grams per inch and the control film showed a heat seal strength of 970 grams per inch.

Except as otherwise specified the heat seal strengths in the preceding examples were measured on samples prepared by superimposing two samples of the films with their top-coats adjacent and overlapped at least one square inch and sealing them at about 130° C. under a pressure of 10 pounds per square inch for about 0.25 second. Samples having free ends and one square inch of heat sealed area, after conditioning, were pulled apart in a Suter Tester, the strength being taken as the force required in grams. The polyethylene samples were pulled in the machine direction.

In preparing the anchor-coated test films of the preceding examples, there was little or no odor of formaldehyde in the coating baths, whereas a strong formaldehyde odor was noted in the coating baths used to prepare the anchor-coated control films.

I claim:

1. Process of preparing an aqueous aminoplast solution for anchor-coating cellophane which comprises (1) heating together, at 60° C. to 65° C. and pH 6.5 to 6.8, 0.007 to 0.133 molar part guanidine, 0.4 to 1.8 molar parts triethanolamine, 8 to 9 molar parts formaldehyde, and 20 to 36 molar parts water, until at least one molecule of formaldehyde reacts per molecule of total amine, to obtain a first aminoplast solution (A), (2) heating (A) with one molar part melamine, at a temperature in the range of 55° C. to 70° C. and a pH in the range of 6.0 to 6.6 which is within about ±0.2 pH unit of

[6.2+(0.21)(a)] where $a$ is any total molar parts of guanidine plus triethanolamine used, in excess of 0.5, per molar part of melamine, to obtain a second aminoplast solution (B) having a viscosity between I and Q on the Gardner-Holdt scale at 25° C.; and (3) diluting (B) with 2 to 3 molar parts formaldehyde, 5 to 12 molar parts water, 4 to 5 moles isopropanol and neutralizing to pH 6.5 to 7.1.

2. An aqueous aminoplast solution prepared by the process of claim 1.

3. Cellophane having a surface anchor-coated with aminoplast prepared by the process of claim 1.

References Cited
UNITED STATES PATENTS

| | | | |
|---|---|---|---|
| 2,769,799 | 11/1956 | Suen et al. | 260—67.6 |
| 2,769,800 | 11/1956 | Suen et al. | 260—67.6 |
| 2,796,362 | 6/1957 | Wooding et al. | 260—67.6 |
| 2,856,314 | 10/1958 | Wooding et al. | 260—67.6 |

SAMUEL H. BLECH, *Primary Examiner.*

JOHN C. BLEUTGE, *Assistant Examiner.*

U.S. Cl. X. R.

260—67.6, 33.4, 29.6; 117—76, 155, 161